(12) United States Patent
Ortiz Egea et al.

(10) Patent No.: US 10,996,169 B2
(45) Date of Patent: May 4, 2021

(54) MULTI-SPECTRAL FLUORESCENT IMAGING

(71) Applicant: Microsoft Technology Licensing, LLC, Redmond, WA (US)

(72) Inventors: Sergio Ortiz Egea, San Jose, CA (US); Maria Esther Pace, Palo Alto, CA (US); Onur Can Akkaya, Palo Alto, CA (US); Michael Scott Fenton, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/287,646

(22) Filed: Feb. 27, 2019

(65) Prior Publication Data

US 2020/0271583 A1 Aug. 27, 2020

(51) Int. Cl.
*G01N 21/64* (2006.01)

(52) U.S. Cl.
CPC ..... *G01N 21/6456* (2013.01); *G01N 21/6486* (2013.01); *G01N 2201/0686* (2013.01)

(58) Field of Classification Search
CPC ........... G01N 21/6456; G01N 21/6486; G01N 2201/0686
See application file for complete search history.

(56) References Cited

U.S. PATENT DOCUMENTS

| | | | |
|---|---|---|---|
| 5,880,473 A | 3/1999 | Ginestet | |
| 6,403,947 B1* | 6/2002 | Hoyt | B82Y 10/00 250/226 |
| 2004/0169854 A1* | 9/2004 | Vo-Dinh | G01N 21/65 356/301 |
| 2012/0307081 A1* | 12/2012 | Dewald | G02B 5/286 348/207.11 |
| 2014/0134713 A1 | 5/2014 | Levenson et al. | |
| 2015/0369728 A1* | 12/2015 | Bahatt | G01N 21/0332 356/328 |
| 2016/0140427 A1* | 5/2016 | Keay | G06K 19/0614 235/494 |
| 2016/0282594 A1* | 9/2016 | Acosta | G06T 7/11 |

(Continued)

OTHER PUBLICATIONS

Duncan, et al., "Real-Time Detection of Microbial Contamination", In Proceedings of IEEE Engineering in Medicine and Biology Magazine, Jan. 2004, pp. 122-129.

(Continued)

*Primary Examiner* — Hugh Maupin
(74) *Attorney, Agent, or Firm* — Alleman Hall Creasman & Tuttle LLP

(57) ABSTRACT

A camera system includes one or more spectral illuminators, a tunable optical filter, and a sensor array. Active spectral light emitted from the one or more spectral illuminators towards a scene is dynamically tuned to an illumination sub-band selected from a plurality of different illumination sub-bands. Sequentially for each of a plurality of fluorescing light sub-bands different than the selected illumination sub-band, the tunable optical filter is adjusted to block light from being transmitted from the scene to the sensor array in all but a tested fluorescing light sub-band from the plurality of different fluorescing light sub-bands, and the sensor array is addressed to acquire one or more image of the scene in the tested fluorescing light sub-band.

20 Claims, 8 Drawing Sheets

(56) References Cited

U.S. PATENT DOCUMENTS

2017/0236281 A1  8/2017  Dacosta
2018/0313760 A1  11/2018  Kramer et al.

OTHER PUBLICATIONS

Kilungo, et al., "Continuous Real-time Detection of Microbial Contamination in Water using Intrinsic Fluorescence", In Journal of of Biosensors & Bioelectronics, Mar. 16, 2013, 5 Pages.

Lloyd, et al., "Is What You Eat and Drink Safe? Detection and Identification of Microbial Contamination in Foods and Water", In Proceedings of the IEEE, vol. 91, No. 6, Jun. 2003, pp. 908-914.

Favreau, et al., "Excitation-Scanning Hyperspectral Imaging Microscope", In Journal of Biomedical Optics, vol. 19, Issue 4, Apr. 11, 2014, 11 Pages.

"International Search Report and Written Opinion Issued in PCT Application No. PCT/US2020/017358", dated Jun. 29, 2020, 18 Pages.

\* cited by examiner

MULTI-SPECTRAL FLUORESCENT IMAGING

BACKGROUND

Various substances intrinsically emit fluorescent light in response to being illuminated with excitation light of particular wavelengths. In some cases, fluorescence may be used as a mechanism for detecting and/or identifying a substance. As one example, fluorescence may be used to detect biological markers, such as proteins lipids, nucleotides, enzymes, and nucleic acid polymers, which all emit fluorescent light in response to being illuminated with different wavelengths of excitation light. The amount of fluorescing light may be directly proportional to the amount of excitation light, and the concentration of the biological marker that is present. Fluorescence may be beneficial as a detection mechanism for biological markers and other substances, because fluorescing light may be emitted by a biological sample immediately in response to being illuminated with excitation light without any physical contact or alteration of the biological sample.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A camera system includes one or more spectral illuminators, a tunable optical filter, and a sensor array. Active spectral light emitted from the one or more spectral illuminators towards a scene is dynamically tuned to an illumination sub-band selected from a plurality of different illumination sub-bands. Sequentially for each of a plurality of fluorescing light sub-bands different than the selected illumination sub-band, the tunable optical filter is adjusted to block light from being transmitted from the scene to the sensor array in all but a tested fluorescing light sub-band from the plurality of different fluorescing light sub-bands, and the sensor array is addressed to acquire one or more image of the scene in the tested fluorescing light sub-band.

DETAILED DESCRIPTION

Fluorescence may be used to detect a substance, such as a biological marker. The present description is directed to a camera that is capable of fluorescent imaging in each of a plurality of different fluorescing light sub-bands for each of a plurality of different illumination sub-bands. In particular, the camera may be configured to emit active spectral light that is dynamically tunable to a plurality of different illumination sub-bands. The camera may be further configured to acquire one or more images in each of a plurality of fluorescing light sub-bands different than a selected illumination sub-band, and identify a spectral fluorescent signature based on the plurality of images. Because the camera is capable of tuning both the wavelength of the active illumination light and the wavelength of the fluorescing light being imaged, the camera can be used to identify a spectral fluorescent signature of a wide variety of substances that react to different wavelengths of illumination light with different fluorescent responses. Moreover, in some implementations, the camera and/or a cooperating computer may be configured to match an identified spectral fluorescent signature to a spectral fluorescent signature of a known substance. In this way, the camera can be used to detect and identify different substances, such as biological markers, based on the fluorescence emitted by such substances.

Figure 1:
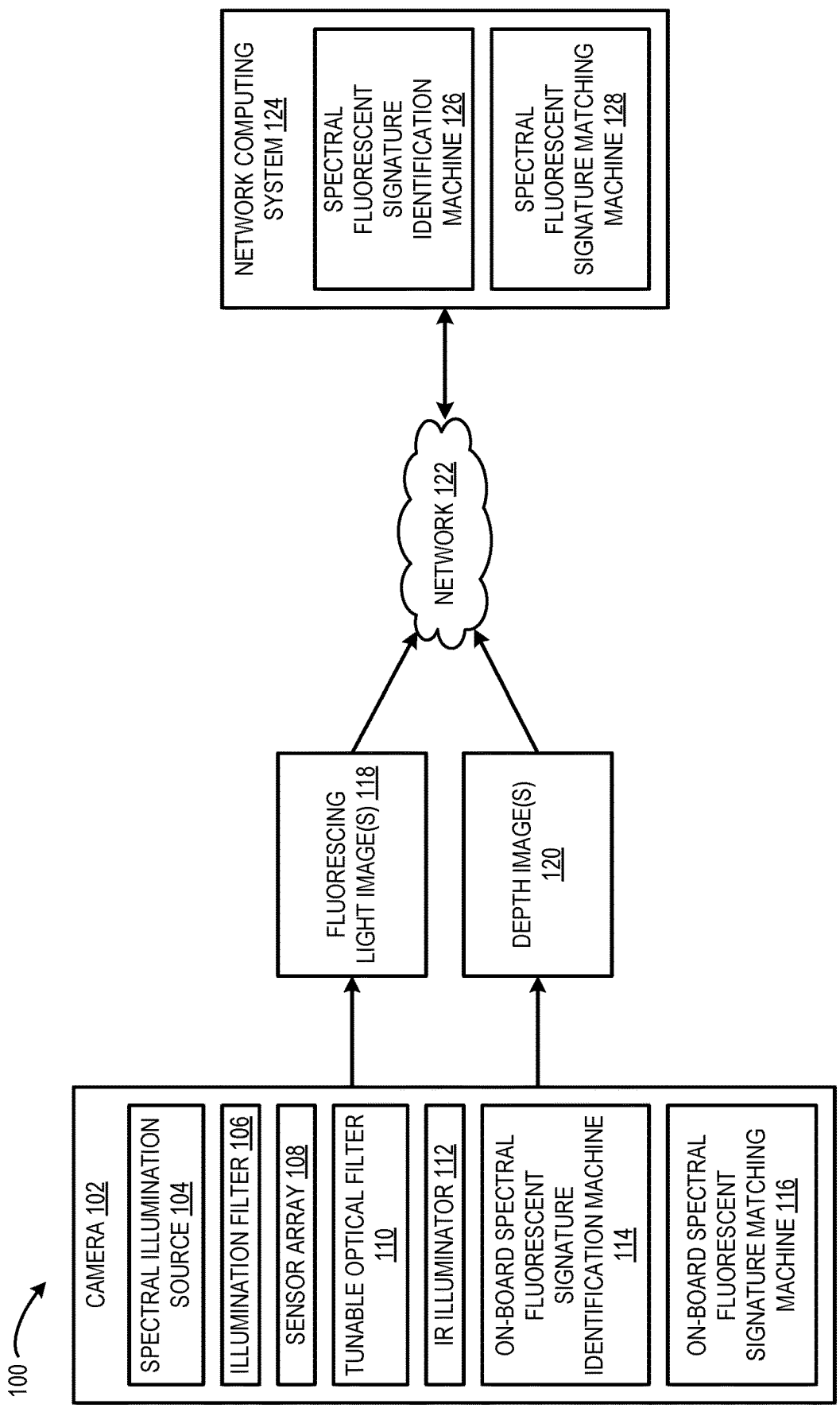
FIG. 1 schematically shows a camera system configured for computer identification of a spectral fluorescent signature.

FIG. 1 schematically shows a camera system 100 configured for computer identification of a spectral fluorescent signature of a substance in a scene. The camera system 100 comprises a camera 102. In one example, the camera 102 may be an ambient invariant depth+multi-spectral camera, as described in more detail with reference to FIGS. 6-7. The camera 102 includes a spectral illumination source 104, an illumination filter 106 positioned optically intermediate the spectral illumination source 104 and a scene, a sensor array 108, an optical tuner 110 positioned optically intermediate the scene and the sensor array 108, and an infrared (IR) illuminator 112.

In order to identify a spectral fluorescent signature in a scene, the camera 102 may illuminate the scene with active spectral light in a selected illumination sub-band, and measure light emitted from the scene in a plurality of fluorescing light sub-bands that are different than the selected illumination light sub-band. An illumination sub-band may be bound by an upper wavelength and a lower wavelength and centered on a central wavelength. Active spectral light tuned to an illumination sub-band may be characterized by having an average spectral radiant intensity equal to the central wavelength of the illumination sub-band. Furthermore, active spectral light emitted from the camera 102 may be tuned to each of a plurality of different illumination sub-bands in order to stimulate fluorescence of different substances in the scene in order to identify a spectral fluorescent signature of the different substances.

The spectral illumination source 104 may be configured to emit active spectral light toward the scene. In order to select an illumination sub-band, the active spectral light emitted from the camera 102 may be tunable to a plurality of different illumination sub-bands. In some implementations, the spectral illumination source 104 may include a plurality of spectral illuminators configured to emit active spectral light in different spectral light sub-bands (e.g., a plurality of differently colored light emitting diodes (LEDs)). In some such examples, the camera 102 may be configured to dynamically tune the active spectral light to a selected illumination sub-band by activating each of the plurality of spectral illuminators that are configured to emit active spectral light in the selected illumination sub-band (e.g., activate the blue LEDs). Correspondingly, the camera 102 may be configured to deactivate each of the plurality of spectral illuminators that are not configured to emit active spectral light in the selected illumination sub-band (e.g., deactivate the green and red LEDs). In some cases, a single spectral illuminator may be activated, and the other spectral illuminators may remain deactivated. In some cases, two or more spectral illuminators may be activated, and the other spectral illuminators may remain deactivated.

In some examples, the camera 102 may be configured to dynamically adjust the illumination filter 106 to block active spectral light from being transmitted from the spectral illuminator source 104 to the scene in all but the selected illumination sub-band. This filtering functionality may be useful in examples where two or more spectral illuminators emit active spectral light in different sub-bands that partially overlap the selected illumination sub-band, and the illumination filter 106 can block active spectral light emitted from the two or more spectral illuminators that is outside of the selected illumination sub-band.

In some implementations, the illumination filter 106 may be omitted from the camera 102. In such implementations, the plurality of illumination sub-bands to which the active spectral light may be dynamically tuned may be limited to the sub-bands of the plurality of spectral illuminators of the spectral illumination source 104.

In other implementations, the spectral illumination source 104 may include a broad-band spectral illuminator, such as a white light source. The broad-band illuminator source may be employed instead of the plurality of spectral illuminators. In such implementations, the camera 102 may be configured to dynamically tune the active spectral light to a selected illumination sub-band by dynamically adjusting the illumination filter 106 to block active spectral light from being transmitted from the broad-band spectral illuminator to the scene in all but the selected illumination sub-band.

The camera 102 may include any suitable mechanism for tuning active spectral light to a selected illumination sub-band from a plurality of different illumination sub-bands. Furthermore, the camera 102 may be configured to dynamically tune active spectral light to any suitable plurality of illumination sub-bands. For example, the camera 102 may be configured to emit active spectral light in illumination sub-bands that stimulate fluorescing light in substances that are desired to be detected, such as a plurality of different biological markers.

While the active spectral light is tuned to a selected illumination sub-band, the camera 102 may acquire one or more images 118 of the scene in a plurality of different fluorescing light sub-bands that are different than the selected illumination sub-band. In some examples, the camera 102 may be configured to dynamically adjust the tunable optical filter 110 to block light from the scene from being transmitted to the sensor array 108 in all but a tested fluorescing light sub-band from the plurality of different fluorescing light sub-bands. The tunable optical filter 110 may block ambient light as well as active spectral light that is outside of the tested fluorescing light sub-band. Further, the camera 102 may be configured to address a plurality of sensors of the sensor array 108 to acquire one or more images 118 of the scene in the tested fluorescing light sub-band.

In some implementations, the sensor array 108 may include a plurality of differential sensors configured to differentially measure ambient light in the imaged scene and the fluorescing light in the tested fluorescing light sub-band within the same clock cycle such that the ambient light may be subtracted from the fluorescing light signal. In this way, the images acquired in each tested fluorescing light sub-band may be ambient light invariant.

The camera 102 may acquire one or more images in each fluorescing light sub-band to test whether a substance in the scene emits fluorescent light in the fluorescing light sub-band in response to stimulation from the active spectral light in the selected illumination sub-band. In some examples, the plurality of fluorescing light sub-bands may be centered at longer wavelengths then a central wavelength of the selected illumination sub-band. For example, when the active illumination sub-band is tuned to a blue wavelength, images may be acquired for green, yellow, orange, and red wavelengths.

Each time the tunable optical filter 110 is tuned to a different tested fluorescing light sub-band of the plurality of fluorescing light sub-bands that are being tested, the camera 102 may address the sensors of the sensor array 108 to acquired one or more images 120 for that tested fluorescing light sub-band. The image acquisition process may be repeated for each of the plurality of different tested fluorescing light sub-bands to measure fluorescing light in the plurality of different tested fluorescing light sub-bands that is emitted by substances in the scene. In some implementations, the sensor array also may be used to acquire an image of the scene in the active spectral light sub-band, and such an image may be used to define the spectral signature.

In some examples, the camera 102 may repeatedly acquire images for each of a plurality of tested fluorescing light sub-bands for each of a plurality of different illumination sub-bands. For example, once images are acquired for green, yellow, orange, and red fluorescing light wavelengths based on active spectral light in the blue illumination sub-band, the active spectral light may be tuned to a violet illumination sub-band, and images may be acquired for green, yellow, orange, and red fluorescing light wavelengths based on active spectral light in the violet illumination sub-band. The overall image acquisition process for spectral fluorescent signature identification may result in acquisition of a plurality of images 118 in each of the tested fluorescing light sub-bands for each of the plurality of illumination sub-bands. In other examples, the image acquisition process for spectral fluorescent signature identification may be limited to acquiring one or more images for each of the plurality of tested fluorescing light sub-bands based on active spectral light in a single illumination sub-band.

Figure 2:
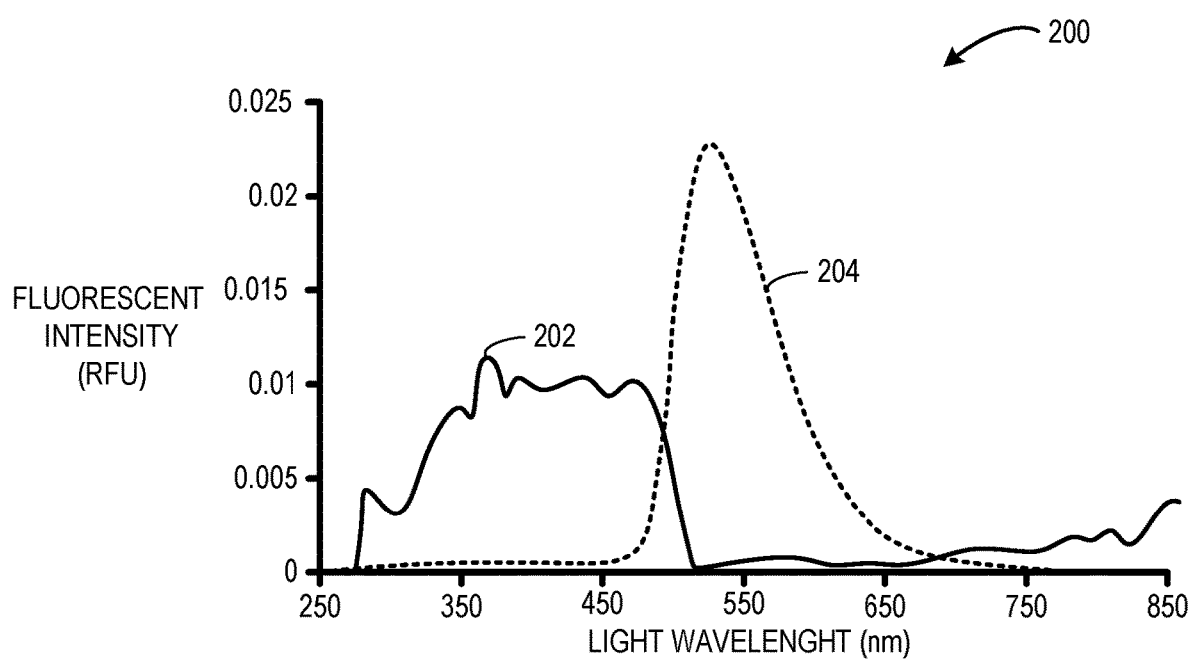
FIG. 2 shows a graph of a spectrum of illumination light and a resulting spectrum of fluorescing light emitted by an example substance in response to being stimulated by the illumination light.

In some implementations, the camera 102 may include an on-board spectral fluorescent signature identification machine 114 configured to identify a spectral fluorescent signature from the one or more images of the scene in each tested fluorescing light sub-band for each of one or more illumination sub-bands. A spectral fluorescent signature is defined by the variation of emittance of fluorescent light of a substance as a function of wavelengths or sub-bands of light. FIG. 2 shows a graph 200 depicting aspects of spectral fluorescence of an example substance (e.g., a biological marker) for one sub-band of illumination light. The graph 200 plots a light spectrum (X-axis) against a fluorescent light intensity (Y-axis). On the graph 200, a solid line 202 represents illumination light for a selected illumination sub-band having higher intensity at wavelengths in the short part of the light spectrum (e.g., blue-ultraviolet). A dotted line 204 represents a resulting fluorescing light emitted by the substance in response to being irradiated with the illumination light in the selected illumination sub-band. The fluorescing light has higher intensity at wavelengths in the longer part of the light spectrum (e.g., Red). The graph 200 shows one illumination sub-band and one tested fluorescing light sub-band. In some implementations, a spectral fluorescent signature may include a fluorescent response in each of a plurality of different fluorescent wavelengths for each of a plurality of different illumination sub-bands. As one example, a spectral fluorescent signature may include a matrix that has illumination sub-bands for one axis and fluorescent response sub-bands for another axis, and which includes for each cell in the matrix the relative fluorescent response at the applicable fluorescent sub-band and illumination sub-band. Further, such a signature may be calculated for each pixel; or a signature may be averaged from a plurality of pixels (e.g., a plurality of pixels identified via an artificial neural network to belong to a subject object).

Figure 3:
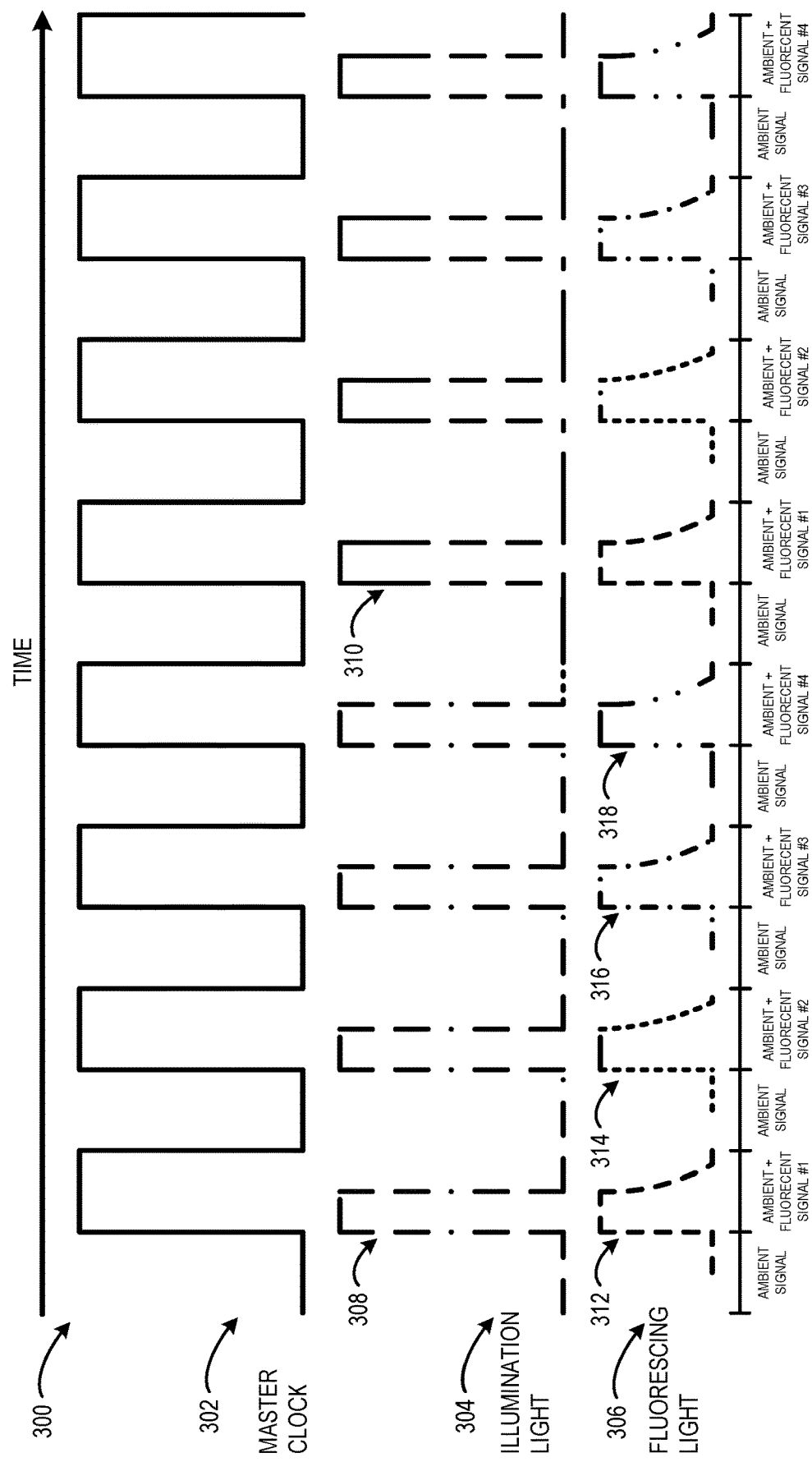
FIG. 3 schematically show an example image acquisition sequence of a camera system configured for computer identification of a spectral fluorescent signature.

FIG. 3 schematically shows aspects of an example image acquisition sequence 300 that may be performed by the camera 102 of FIG. 1 for identification of a spectral fluorescent signature. Note that only activation and deactivation times of the different illuminators and the sensor array are depicted. It will be appreciated that parameters of the light (e.g., frequency, amplitude) may be modulated within each activation/deactivation cycle for the different illuminators. The image acquisition sequence 300 depicts a master clock signal 302, illumination light signals 304, and a fluorescing light signals 306.

The image acquisition sequences 300 is guided by the master clock signal 302. At the beginning of the image acquisition sequence, in the low level of the master clock signal 302, the spectral illumination source 104 is turned off such that the camera 102 does not emit active spectral light, and the tunable optical filter 110 is centered onto a specific region of the optical spectrum corresponding to a first tested fluorescing light sub-band 312. In this example, the first tested fluorescing light sub-band is green. Further, in this example, green is the first of four tested fluorescing light sub-bands that are tested in the image acquisition sequence 300. During the low level of the master clock signal 302, the narrowband ambient light is collected by the sensor array 108. In the high level of the master clock signal 302, the spectral illumination source 104 is turned on and dynamically tuned for a first selected illumination sub-band 308. In one example, the first selected illumination sub-band is blue. The spectral illumination source 104 is turned on in a period of time lesser than the time the master clock signal 302 swaps between the low and high state, so that a maximum of the fluorescence is collected without affecting the ambient frame. During the high level of the master clock signal 302, both ambient and fluorescing light in the first tested fluorescing light sub-band 312 is collected by the sensor array 108. The ambient light collected during the low level of the master clock signal is subtracted from the light collected during the high level of the master clock signal to measure the fluorescing light in the first fluorescing light sub-band 312. Continuing with the above example, in this way, the green fluorescing light emitted as a result of stimulation by the blue illumination light is measured by the sensor array 108.

In the next clock cycle of the master clock signal 302, the tunable optical filter is dynamically tuned to be centered on a second tested fluorescing light sub-band 314 (e.g., yellow), and the sensor array 108 measures the yellow fluorescing light emitted as a result of stimulation by the blue illumination light. In the next clock cycle of the master clock signal 302, the tunable optical filter is dynamically tuned to be centered on a third tested fluorescing light sub-band 316 (e.g., orange), and the sensor array 108 measures the orange fluorescing light emitted as a result of stimulation by the blue illumination light. In the next clock cycle of the master clock signal 302, the tunable optical filter is dynamically tuned to be centered on a fourth tested fluorescing light sub-band 314 (e.g., red), and the sensor array 108 measures the red fluorescing light emitted as a result of stimulation by the blue illumination light.

After the four fluorescing light sub-bands are tested for the blue illumination light, in the next clock cycle, active spectral light emitted from the spectral illumination source 104 is dynamically tuned to a second illumination sub-band 310 (e.g., violet), and the sensor array 108 sequentially one at a time measures the green, yellow, orange, and red fluorescing light emitted as a result of stimulation by the violet illumination light. The image acquisition sequence 300 may continue in this way for all of illumination sub-bands in order to acquire images for identification of a spectral fluorescent signature. In some implementations, the fluorescent sub-bands are the same for each illumination sub-band; in other implementations, different fluorescent sub-bands are tested for at least some of the illumination sub-bands.

Returning to FIG. 1, the camera 102 may be further configured to acquire depth images that may be used to identify spectral fluorescent signatures for a plurality of different substances or surfaces in an imaged scene. In particular, the camera 102 may be configured to activate the IR illuminator 112 to emit active IR light in an IR light sub-band towards the scene and address the plurality of sensors of the sensor array 108 to acquire one or more depth images 120 of the scene based on active IR light reflected from the scene. In some examples, the camera 102 may be configured to have a Time of Flight capability to evaluate distances in the scene from the one or more depth images. In some examples, the camera 102 may be configured to calculate a surface normal for each different surface in the scene from the one or more depth images. Further, the camera 102 may use the calculated distances and surface normals to calculate an irradiance impinging on different substances responsible for emitting the fluorescence. The depth images 120 may be used to identify and distinguish different substances/surfaces in the scene having different spectral fluorescent signatures. From the collected and/or calculated signals including the fluorescing light images 118 and the depth images 120, the on-board spectral fluorescent identification machine 114 may be configured to calculate a fluorescent ratio between excitation light and fluorescent light for a selected sub-band. The on-board spectral fluorescent identification machine 114 may repeat this calculation for a plurality of different sub-bands to identify a complete fluorescent characterization or fluorescent signature of a substance, such as a biological marker.

Because the camera 102 is configured to acquire both depth images and fluorescing light images on the same sensor array, a fluorescent backscattering coefficient for a substance may be accurately calculated in each of the sub-bands of fluorescing light. This allows the machine 114 to accurately determine a true spectral fluorescent signature of the substance that is minimally or not biased by ambient light. As such, the limitations of traditional recognition techniques including time-dependent factors (e.g., pose, facial expressions) and environmental factors (e.g., ambient color temperature or intensity) may be overcome to increase the accuracy of identification. In other words, the identification performed by the machine 114 may be robust due to the ambient invariance of the imaging performed by the camera 102.

In some implementations, the on-board spectral fluorescent signature identification machine 114 may be configured to identify different spectral fluorescent signatures of different substances in an imaged scene based on the fluorescing light images 118 and the depth images 120. The on-board spectral fluorescent signature identification machine 114 may divide the imaged scene in any suitable manner to identify different spectral fluorescent signatures. In some examples, the on-board spectral fluorescent signature identification machine 114 may be configured to recognize different objects in an imaged scene based on the depth images and/or various spectral images and identify spectral fluorescent signatures of each of the recognized objects. In other examples, the on-board spectral fluorescent signature identification machine 114 may be configured to divide an imaged scene into different regions and identify spectral fluorescent signatures in each of the different regions.

In some implementations, the camera 102 may include an on-board spectral fluorescent signature matching machine 116 configured to match the identified spectral fluorescent signature to a known substance. For example, the on-board spectral fluorescent signature matching machine 116 may utilize, a previously trained artificial neural network to match the identified spectral fluorescent signature with a known substance. In some examples, the on-board spectral fluorescent signature matching machine 116 may be configured to recognize a limited set of known substances based on their spectral fluorescent signatures. The number of known substances of the set may be dictated by the on-board computing resources of the camera 102. In some such examples, the on-board spectral fluorescent signature matching machine 116 may be programmed for specific applications. For example, if the camera 102 is used in a hospital environment, then the on-board spectral fluorescent signature matching machine 116 may be programmed to recognize the spectral fluorescent signature of a plurality of different biological markers (e.g., for different proteins lipids, nucleotides, enzymes, and nucleic acid polymers).

In some implementations, the camera 102 may be communicatively coupled via a computer network 122 with a network computing system 124. In some examples, the network computing system 124 may comprise a network server, edge computing device, internet-of-things (IoT) device, a desktop, laptop or tablet computer, mobile computing device, mobile communication device (e.g., smart phone), and/or other computing device that may or may not be physically integrated with other components described herein. Additional details regarding the components and computing aspects of the computing system are described in more detail below with reference to FIG. 8. In some examples, the network computing system 124 may be located remotely from the camera 102 and may host a variety of remote services that may be used to identify spectral fluorescent signatures of different substances and/or match identified spectral fluorescent signatures to known substances. In other examples, the network computing system 124 may be located on the same premises as the camera 102. In yet other examples, aspects of the network computing system 124 may be integrated into the camera 102. In different examples, various combinations of the camera 102 and aspects of the network computing system 124 may be enclosed in a common housing.

In some implementations, a spectral fluorescent signature identification machine 126 may be executed by the network computing system 124. The spectral fluorescent signature identification machine 126 may be configured to identify one or more spectral fluorescent signatures of substances in images received from the camera 102. In particular, the camera 102 may send the fluorescing light images 118 and the depth images 120 to the network computing system 124 via the computer network 122. The spectral fluorescent signature identification machine 126 may computer analyze the images to identify one or more spectral fluorescent signatures. In some implementations, the spectral fluorescent signature identification machine 126 may utilize, for example, a previously trained artificial neural network trained to accept one or more fluorescing light, and/or depth images as inputs. In some implementations, the spectral fluorescent signature identification machine 126 may be trained using images acquired by a plurality of other network connected cameras configured in the same manner as the camera 102 in order to have a large training set of images. In some examples, the network computing system 124 may send the identified spectral fluorescent signatures to the camera 102 via the computer network 122. In some examples, the network computing system 124 may present the identified spectral fluorescent signatures via a display. In some implementations, the camera 102 may not have spectral fluorescent signature identification functionality and such processing may be handled solely by the network computing system 124. In some examples, the on-board spectral fluorescent signature identification machine 114 and the network connected spectral fluorescent signature identification machine 126 may work in conjunction such that each machine may perform some processing operations to identify a spectral fluorescent signature.

In some implementations, a spectral fluorescent signature matching machine 128 may be executed by the network computing system 124. The spectral fluorescent identification machine 128 may be configured to match an identified spectral fluorescent signature to a known substance. In some implementations, the spectral fluorescent signature matching machine 126 may utilize, for example, a previously trained artificial neural network trained to match an identified spectral fluorescent signature to a known substance. In some implementations, the camera 102 may not have spectral fluorescent signature matching functionality and such processing may be handled solely by the network computing system 124. In some examples, the on-board spectral fluorescent signature matching machine 116 and the network connected spectral fluorescent signature matching machine 128 may work in conjunction such that each machine may perform some processing operations to match an identified spectral fluorescent signature to a known substance. In some examples, the spectral fluorescent signature matching machine 128 may have expanded matching capabilities relative to the on-board spectral fluorescent signature matching machine 116. For example, the spectral fluorescent signature matching machine 128 may have a larger database of identified spectral fluorescent signatures of known substances.

The machines 114, 116, 126, 128 may employ any suitable combination of state-of-the-art and/or future machine learning (ML) and/or artificial intelligence (AI) techniques. Non-limiting examples of such techniques include support vector machines, multi-layer neural networks, convolutional neural networks (e.g., including spatial convolutional networks for processing images and/or videos), recurrent neural networks (e.g., long short-term memory networks), associative memories (e.g., lookup tables, hash tables, Bloom Filters, Neural Turing Machine and/or Neural Random Access Memory), unsupervised spatial and/or clustering methods (e.g., nearest neighbor algorithms, topological data analysis, and/or k-means clustering) and/or graphical models (e.g., Markov models, conditional random fields, and/or AI knowledge bases). The machines 114, 116, 126, 128 may be implemented as any suitable physical hardware and/or firmware component.

In some examples, the methods and processes utilized by the machines 114, 116, 126, 128 may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters may be adjusted through any suitable training procedure, in order to continually improve functioning of the machines 114, 116, 126, 128.

Additionally, in some implementations, the camera 102 may be configured to adjust operation to improve future spectral fluorescent signature identification based on identifying a spectral fluorescent signature. In some examples, the camera 102 may be configured to adjust a spectral image parameter of the camera 102 for future spectral fluorescent signature identification based on the identified spectral fluorescent signature. In one example, the camera 102 may be configured to recognize that one or more tested fluorescing light sub-bands may not register any significant fluorescent light intensity after identifying a threshold number of spectral fluorescent signatures. In response to such recognition, the camera 102 may be configured to adjust the fluorescing light sub-bands that are tested in order to more efficiently measure fluorescent light. In other examples, the camera 102 may be configured to increase or decrease the size of particular sub-bands that are tested based on identifying spectral fluorescent signature(s). The camera 102 may be configured to adjust any suitable operating parameter based on identifying a spectral fluorescent signatures in order to improve to improve future spectral fluorescent signature identification.

Figure 4:
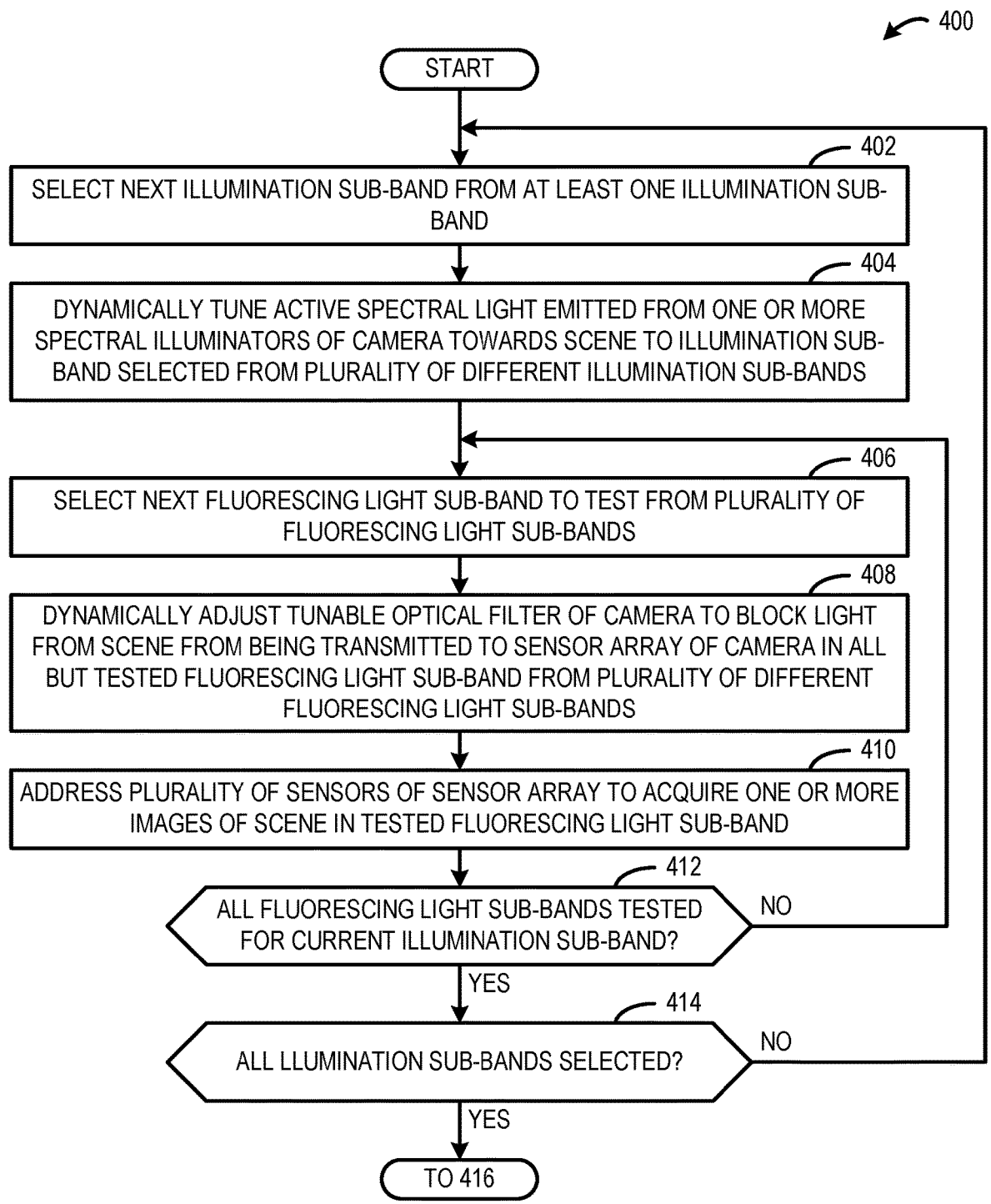
FIGS. 4 and 5 are a flowchart of an example method for computer identifying a spectral fluorescent signature.
Figure 5:
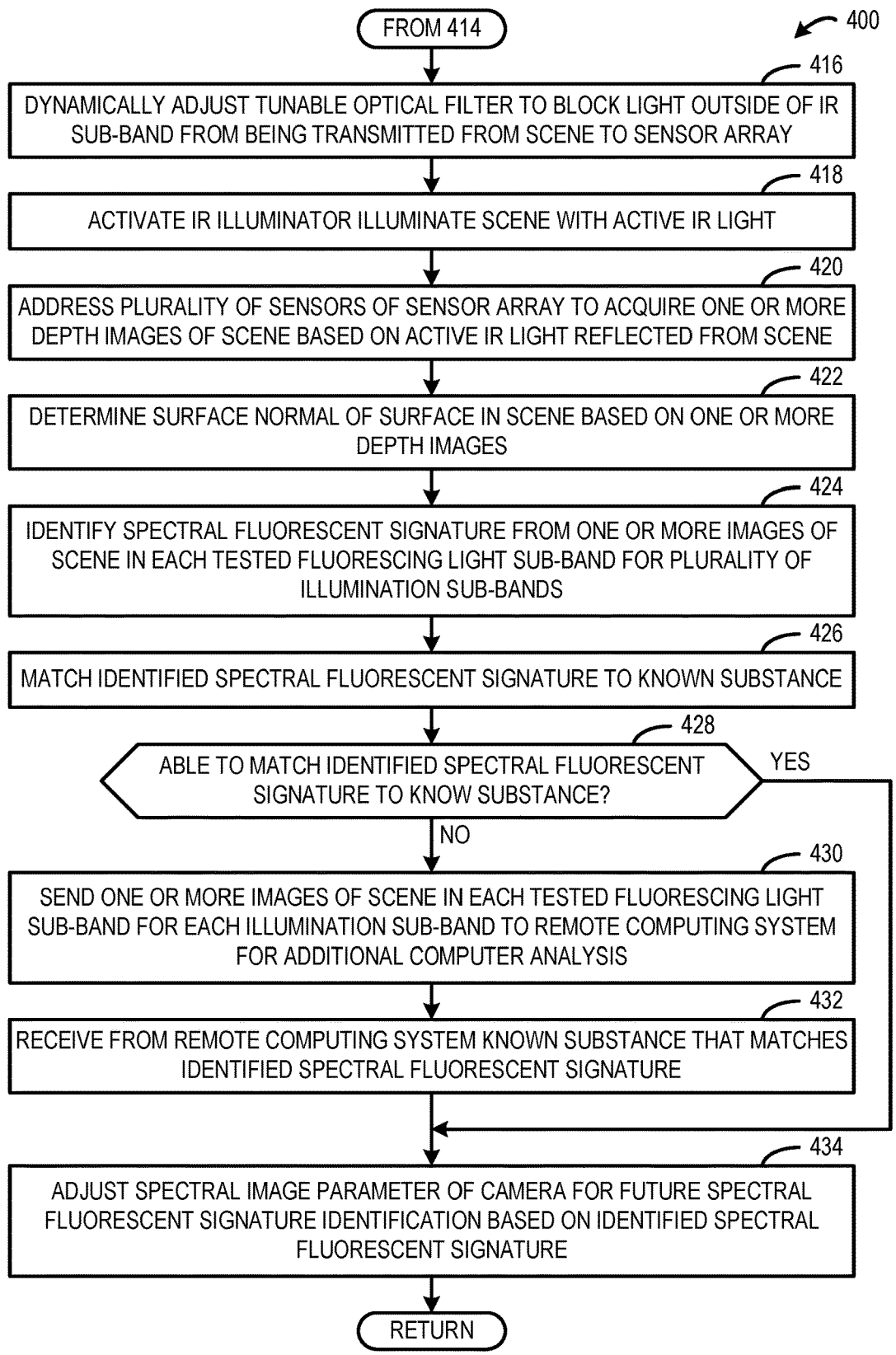

FIGS. 4 and 5 show a method 400 for computer identifying a spectral fluorescent signature in a scene imaged using a camera, such as the camera 102 of FIG. 1. For example, method 400 may be enacted by the camera system 100 of FIG. 1.

In FIG. 4, at 402, the method 400 includes selecting a next illumination sub-band to illuminate a scene from at least one illumination sub-band. In some implementations, a single illumination sub-band may be used to illuminate a scene. In other implementations, each of a plurality of different illumination sub-bands may be used to illuminate a scene one at a time. At 404, the method 400 includes dynamically tuning active spectral light emitted from one or more spectral illuminators of a camera towards the scene to the selected illumination sub-band. At 406, the method 400 includes selecting a next fluorescing light sub-band to test from a plurality of different fluorescing light sub-bands. At 408, the method 400 includes dynamically adjusting a tunable optical filter of the camera to block light from the scene from being transmitted to a sensor array of the camera in all but the tested fluorescing light sub-band selected from the plurality of different fluorescing light sub-bands. At 410, the method 400 includes addressing a plurality of sensors of a sensor array of the camera to acquire one or more images of the scene in the tested fluorescing light sub-band.

At 412, the method 400 includes determining whether all fluorescing light sub-bands of the plurality of different fluorescing light sub-bands have been tested for the currently selected illumination sub-band. In other words, it is determined whether one or more images have been acquired for each of the plurality of different fluorescing light sub-bands while the active spectral light is tuned to the selected illumination sub-band. If not all fluorescing light sub-bands have been tested while the active spectral light is tuned to the selected illumination sub-band, then the method 400 returns to 406 and repeats steps 406-414 until all fluorescing light sub-bands have been tested for the selected illumination sub-band.

At 414, method 400 includes determining whether all illumination sub-bands have been selected from the plurality of different illumination sub-bands for fluorescing light image acquisition. If not all illumination sub-bands have been selected, then the method 400 returns to 402 to select the next illumination sub-band and continue the image acquisition process. Otherwise, the method 400 moves to 416.

In FIG. 5, at 416, the method 400 includes dynamically adjusting the tunable optical filter to block all light outside of the IR sub-band from being transmitted from the scene to the sensor array. At 418, the method 400 includes activating an IR illuminator of the camera to illuminate the scene with active IR light. At 420, the method 400 includes addressing the plurality of sensors of the sensor array to acquire one or more depth images of the scene based on active IR light reflected from the scene. At 422, the method 400 includes determining a surface normal of a surface in the scene based on the one or more depth images. At 424, the method 400 includes identifying a spectral fluorescent signature from the one or more images in each tested fluorescing light sub-band for the plurality of illumination sub-bands. In some implementations, the method 400 optionally may include identifying the spectral fluorescent signature further based on the one or more depth images. In some such implementations, the method 400 optionally may include identifying different spectral fluorescent signatures for different surfaces in the scene based on the one or more images in each tested fluorescing light sub-band for the plurality of illumination sub-bands and the one or more depth images.

At 426, the method 400 includes matching the identified spectral fluorescent signature to a known substance. In one example, the identified spectral fluorescent signature may be matched to a known biological marker. At 428, the method 400 includes determining whether the identified spectral fluorescent signature is able to be matched with a known substance. If the identified spectral fluorescent signature is able to be matched with a known substance, then the method 400 moves to 434. Otherwise, the method 400 moves to 430.

At 430, the method 400 includes sending send the one or more images of the scene in the tested fluorescing light sub-band to a remote computing system for additional computer analysis if the identified spectral fluorescent signature cannot be matched to a known substance. For example, the images may be sent to network computing system 124 of FIG. 1. At 432, the method 400 includes receive from the remote computing system a known substance that matches the identified spectral fluorescent signature.

At 434, the method 400 includes adjusting a spectral image parameter of the camera for future spectral fluorescent signature identification based on the identified spectral fluorescent signature. As one example, adjusting the spectral image parameter may include changing a fluorescing light sub-band that is tested during future spectral fluorescent signature identification.

The process flow described above with reference to FIGS. 4 and 5 is exemplary. The specific steps described above may be performed in the sequence illustrated and/or described, in other sequences, in parallel, or omitted. For example, a spectral fluorescent signature may not be identified in all implementations, or a spectral fluorescent signature may be identified without taking a depth image and/or determining a surface normal. When depth imaging and/or surface normal determining steps are performed, such steps may instead be executed within the loops established by steps 412 and/or 414. Likewise, steps 426-434 may be omitted in some implementations.

Figure 6A:
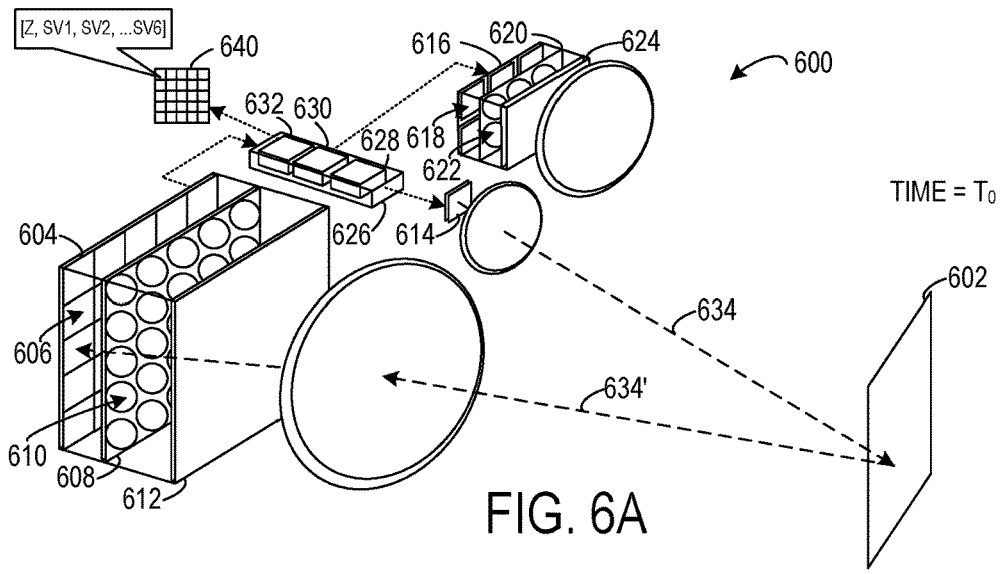
FIGS. 6A-6C are exploded, schematic views showing aspects of an example camera system.
Figure 6B:
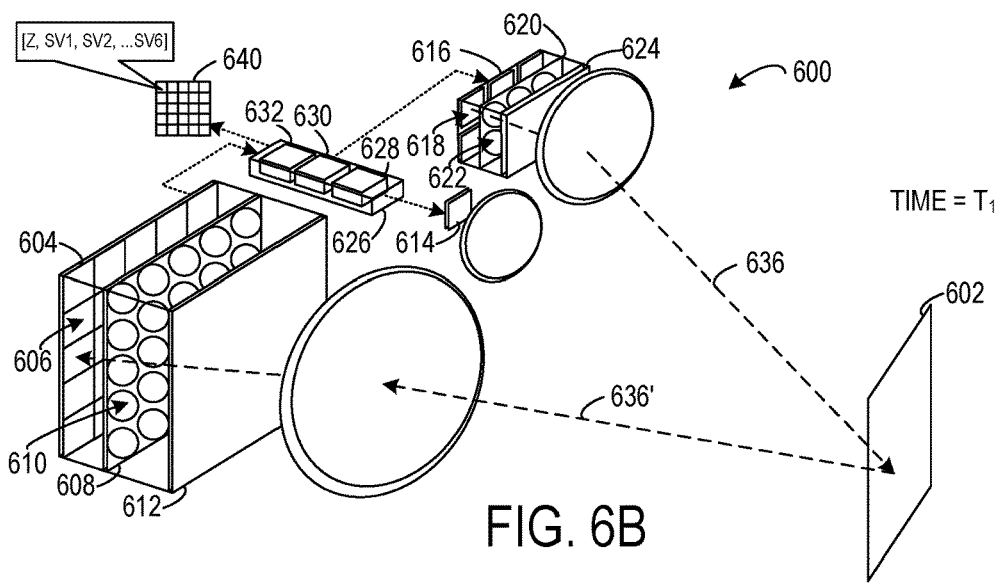
Figure 6C:
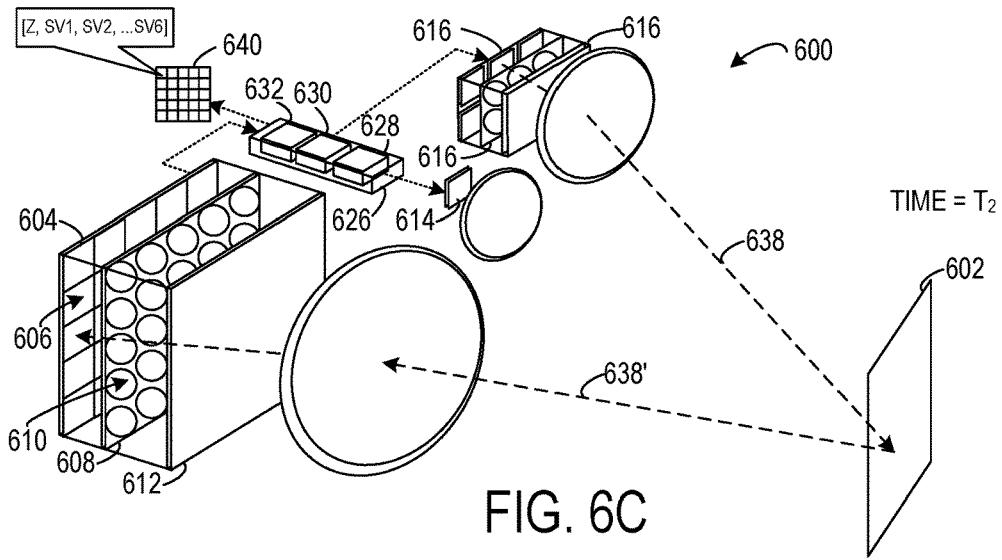

FIGS. 6A-6C show aspects of an example camera 600. For example, the camera 600 may take the form of camera 102 shown in FIG. 1 The term 'camera' refers herein to any imaging component having at least one optical aperture and sensor array configured to image a scene or subject 602. Camera 600 includes sensor array 604 of individually addressable sensors 606. In some implementations, the sensors may be complementary metal-oxide semiconductor (CMOS) elements, but other suitable architectures are envisaged as well. Each sensor is responsive to light over a broad wavelength band. For silicon-based sensors, the wavelength response may range from 300 to 1100 nm, for example. Sensor array 604 is schematically illustrated with only twenty-five sensors 606 for simplicity, although there is no theoretical limitation to the number of sensors 606.

In some implementations, the sensors 606 of sensor array 604 may be differential sensors. Each differential sensor may include different collection regions that are energized according to two different clock signals. In one example, to measure modulated active illumination, the two clock signals may be substantially complementary (e.g., the two clock signals have 50% duty cycles that are 180 degrees out of phase). In other examples, the two different clock signals may have a different relationship, such as for measuring ambient illumination or non-modulated active illumination. When the different regions are activated based on the corresponding clock signal, electric fields are created that attract and collect photoelectric charges in the different regions that are separated by shallow trench isolation (STI).

Such operation allows for the same sensor array to be used to measure active light across a broad spectrum including ultraviolet, visible, NIR, and IR light. Further, the differential sensors may reduce system noise because only one read operation is required to perform a differential measurement of active spectral light and ambient light (i.e., (active light plus ambient light) minus ambient light). In particular, each pixel readout/reset operation may add system noise per occurrence. Thus, rather than performing two separate measurements (i.e., active, passive) that require two readouts, and then adding (or subtracting) each result to memory, a single differential measurement may be performed within the pixel and the single differential measurement may be read out to memory.

In other camera implementations that do not include sensor arrays of differential sensors, additional clock cycles may be required to perform a differential measurement. While differential sensors provide the advantages described herein, it will be appreciated that any suitable type of sensor array, including non-differential sensor arrays, may be implemented.

Microlens array 608 optionally may be arranged directly over sensor array 604. Microlens array 608 includes a plurality of microlens elements 610. Each microlens element 610 of microlens array 608 may be registered to a differential sensor 606 of the sensor array 604. When included, microlens array 608 may provide a larger effective fill factor at each of the sensors, for increased collection efficiency and reduced cross-talk between pixels.

Tunable optical filter 612 may be arranged over sensor array 604, so as to optically cover the sensor array. The tunable optical filter 612 is switchable electronically between different light-filtering states. In one example, the tunable optical filter 612 may include a plurality of light filtering states. In one filtering state, the optical shutter 612 may transmit IR light and block light outside of the IR band (e.g., visible light). In another filtering state, the tunable optical filter 612 may be dynamically tuned to block light in all but a selected spectral or fluorescing light sub-band. The tunable optical filter 612 may increase a signal-to-noise ratio of IR images and fluorescing light images acquired by the sensor array 604. The tunable optical filter 612 may include any suitable type of filter that transmits a narrow-band of light without significantly reducing the intensity of the in-band signal received by the sensor array. In one example, the tunable optical filter 612 may include one or more liquid crystal layers.

An IR illuminator 614 is configured to emit active IR light to illuminate the scene 602. In one example, the IR illuminator 614 includes an IR laser configured to emit IR light. In some implementations, the IR illuminator 614 optionally may include a diffuser positioned in between the IR illuminator 614 and the scene 602. The diffuser may diffuse IR light emitted from the IR illuminator 614 to produce a field of illumination that illuminates the scene 602 with IR light.

A spectral illumination source 616 is configured to emit active spectral light to illuminate the scene 602. The spectral illumination source may include one or more spectral illuminators 618. In the depicted implementation, the spectral illumination source 616 includes six spectral illuminators 618. In some implementations, the plurality of spectral illuminators 618 each may be configured to emit active spectral light in a different sub-band. In some implementations, multiple illuminators may emit active spectral light in overlapping sub-bands. Each of the spectral illuminators may be individually controllable—e.g., a single spectral illuminator may be activated while the other spectral illuminators remain deactivated. The plurality of spectral illuminators 618 may take any suitable form. In one example, the spectral illuminators 618 include light emitting diodes (LEDs) configured to emit active spectral light. There is not a theoretical limit on the number of spectral illuminators that may be used, nor on the spectral-light sub-bands that each spectral illuminator may be configured to emit.

In one example implementation, the camera 600 may include, in addition to the IR source 614, six spectral illuminators respectively configured to emit deep blue (460 nm), blue (470 nm), true green (528 nm), yellow (587 nm), amber (617 nm), and red (625 nm). In an example implementation, each spectral illuminator may have a full width at half maximum (FWHM) of 20 nm, and a field of illumination (FOI) of 80 degrees. While not required, the camera 600 typically includes more than three spectral illuminators. In some implementations, the spectral illuminators may emit light in other sub-bands, such as hyper-red, near IR, or IR.

In other implementations, the camera 600 may include a broad-band illumination source, such as a white light source. The broad-band illumination source may be employed instead of the plurality of spectral illuminators. In some implementations, the broad-band illumination source may be modulated. In other implementations, the broad-band illumination source may be un-modulated. In general, although the camera 600 is described in the context of a multi-/hyper-spectral+depth camera capable of acquiring both multi-spectral light image data and depth data, both of these features are optional.

Collimating lens array 620 optionally may be arranged directly in front of the plurality of spectral illuminators 618. Collimating lens array 620 includes a plurality of collimating lenses 622. Each collimating lens 622 of collimating lens array 620 may be registered to a different spectral illuminator 618 such that each collimating lens is operatively intermediate the corresponding spectral illuminator 618 and the scene 602. Each collimating lens 622 is configured to collimate active spectral light emitted from the corresponding spectral illuminator 618.

A tunable illumination filter 624 optionally may be arranged optically intermediate the spectral illumination source 616 and the scene 602. When included, the tunable illumination filter 624 is configured to receive active spectral light emitted from the spectral illumination source 616 and selectively transmit active spectral light in a selected illumination sub-band to illuminate the scene 602. The tunable illumination filter 624 may be configured to substantially block spectral light outside of the selected illumination sub-band. For example, the selected sub-band may be a narrow sub-band (e.g., having a transmission peak of approximately 1 nm). The tunable illumination filter 624 is dynamically adjustable to change a selected illumination sub-band of the active spectral light that illuminates the scene 602. For example, the tunable illumination filter 624 may be dynamically adjusted to transmit spectral light in a selected sub-band (e.g., 470 nm) and substantially block spectral light outside of the selected sub-band. Subsequently, the tunable illumination filter 624 may be dynamically adjusted to transmit spectral light in another narrow illumination sub-band (e.g., 475 nm) and substantially block spectral light outside of the selected illumination sub-band. In this way, the tunable illumination filter 624 may be dynamically adjusted to selectively transmit different narrow sub-bands within the emission band of at least one active spectral illuminator. It will be appreciated that the tunable illumination filter 624 may be dynamically adjusted to any suitable different illumination sub-bands within any suitable emission band of the spectral illumination source 616. In another example, the tunable illumination filter may be dynamically adjusted to transmit spectral light in different selected sub-bands that are within different emission bands of different spectral illuminators. In one example the tunable illumination filter 624 may be adjusted to transmit spectral light at 470 nm with the emission band of a blue spectral illuminator. Subsequently, the tunable illumination filter 624 may be dynamically adjusted to transmit spectral light at 625 nm within the emission band of a red spectral illuminator. In this way, the tunable illumination filter 624 may be dynamically adjusted to sequentially illuminate the scene 602 with active spectral light in a plurality of different sub-bands corresponding to each of a plurality of different emission bands of different spectral illuminators in order to acquire spectral light image data for multi- or hyper-spectral imaging.

Electronic controller 626 may include a logic machine and associated storage machine. The storage machine may hold instructions that cause the logic machine to enact any operation, algorithm, computation, or transformation disclosed herein. In some implementations, the logic machine may take the form of an application-specific integrated circuit (ASIC) or system-on-a-chip (SoC), in which some or all of the instructions are hardware- or firmware-encoded. Electronic controller 626 includes a depth controller machine 628, a spectral controller machine 630, and an output machine 632. Machines 628, 630, 632 may be implemented as separate physical hardware and/or firmware components or incorporated into a single hardware and/or firmware component.

The depth controller machine 628 is configured to activate the IR illuminator 614 and synchronously address the sensors 606 of sensor array 604 to acquire IR images. The depth controller machine 628 is further configured to dynamically adjust the tunable optical filter 612 to block light outside of the IR light sub-band in synchronicity with activation of the IR illuminator 614 and address of the sensor array 604. In the example shown in FIG. 6A, at time $T_0$, the depth controller machine 628 adjusts the tunable optical filter 612, activates the IR illuminator 614 to illuminate the scene 602 with active IR light 634, and addresses the sensors 606 of sensor array 604 in synchronicity to measure an aspect of the active IR light emitted from the IR illuminator and reflected from the scene. In particular, IR light 634' reflects from the scene 602 back to the camera 600, is transmitted through the optical shutter 612, and is incident on the sensors 606 of the sensor array 604 for IR image acquisition. Note that the depth controller machine 628 may acquire a plurality of IR images in the process of acquiring a depth map.

FIG. 6B shows camera 600 measuring fluorescing light in a first selected illumination sub-band emitted by a first spectral illuminator. In the depicted example, at time $T_1$, the spectral controller machine 630 activates the first spectral illuminator to emit active spectral light in the first selected illumination sub-band (e.g., blue) and deactivates the other spectral illuminators of the plurality of spectral illuminators 618. The spectral controller machine 630 synchronously, dynamically adjusts the tunable illumination filter 624 to selectively transmit active spectral light in the first selected sub-band (e.g., blue) while substantially blocking light outside of the first selected sub-band, thus illuminating the scene 602 in active spectral light 636 in the first illumination selected sub-band (e.g., blue). Also, the spectral controller machine 630 synchronously, dynamically adjusts the tunable optical filter 612 to block light from being transmitted from the scene to the sensor array in all but a tested fluorescing light sub-band different than the illumination sub-band. Active spectral light 636' in the first selected illumination sub-band stimulates a substance in the scene to emit fluorescing light back to the camera 600. Fluorescing light in the tested fluorescing light sub-band is transmitted by the tunable optical filter 612 to the same sensors 606 used to measure the depth to the scene 602. The spectral controller machine 630 synchronously addresses the sensors 606 of sensor array 604 to acquire fluorescing light image data in the tested fluorescing light sub-band based on active spectral light in the first selected illumination sub-band (e.g., blue). The spectral controller machine 630 may be configured to repeat the image acquisition process for each of a plurality of different fluorescing light sub-bands for the selected illumination sub-band.

Further, as shown in FIG. 1C, at time $T_2$, the spectral controller machine 622 activates a second spectral illuminator to emit active spectral light in a second selected illumination sub-band (e.g., green) and deactivates other spectral illuminators of the plurality of spectral illuminators 618. The spectral controller machine 630 synchronously, dynamically adjusts the tunable illumination filter 624 to selectively transmit active spectral light in the second selected sub-band (e.g., green) while substantially blocking light outside of the second selected sub-band, thus illuminating the scene 602 in active spectral light 638 in the second selected sub-band (e.g., green). The spectral controller machine 530 dynamically tunes the tunable optical filter to a tested fluorescing light sub-band different than the second selected illumination sub-band. Active spectral light 638' in the second selected illumination sub-band stimulates a substance in the scene 602 causing fluorescent light to be emitted back to the camera 600. Fluorescing light in the tested fluorescing light sub-band is transmitted by the tunable optical filter 612 to the same sensors 606 used to measure the depth to the scene 602. The spectral controller machine 630 synchronously addresses the sensors 606 of sensor array 604 to acquire fluorescing light image data in the tested fluorescing light sub-band based on active spectral light in the second selected illumination sub-band (e.g., green). The spectral controller machine 630 may be configured to repeat the image acquisition process for each of a plurality of different fluorescing light sub-bands for the selected illumination sub-band.

Figure 7A:
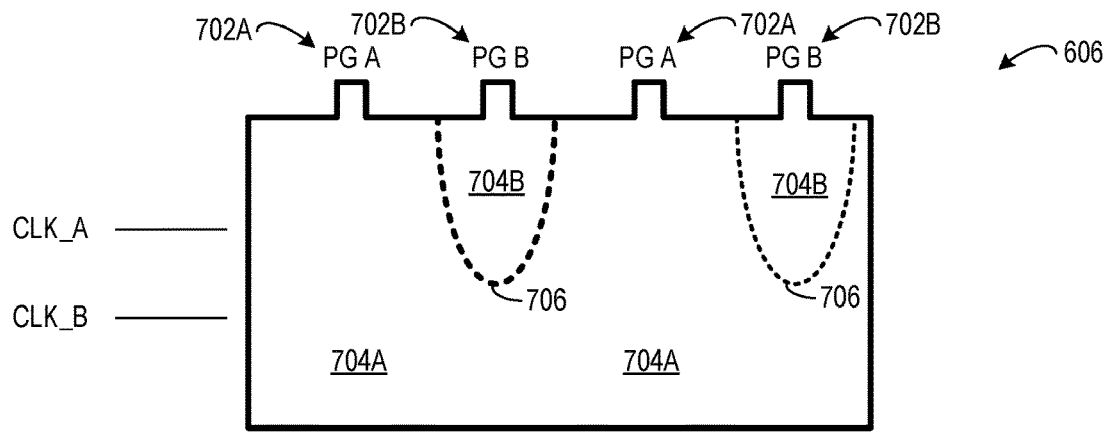
FIGS. 7A-7C schematically show a differential sensor of a sensor array.
Figure 7B:
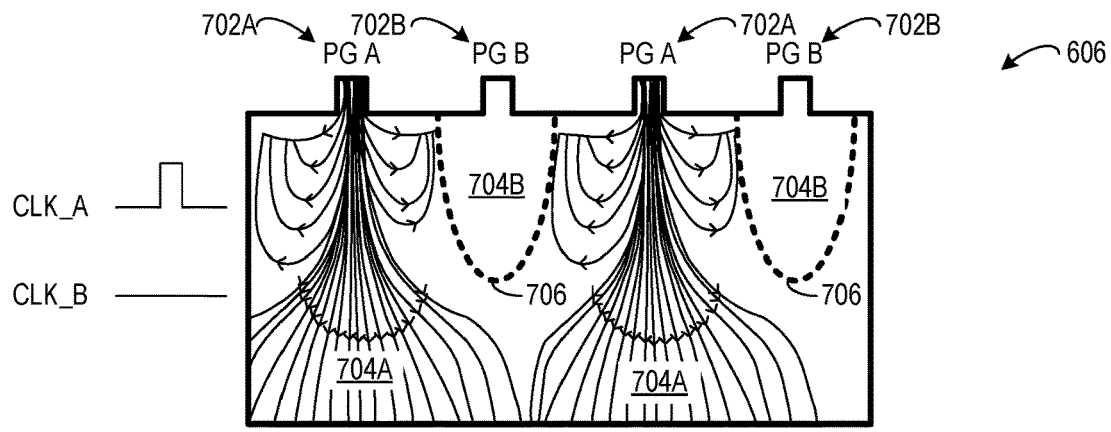
Figure 7C:
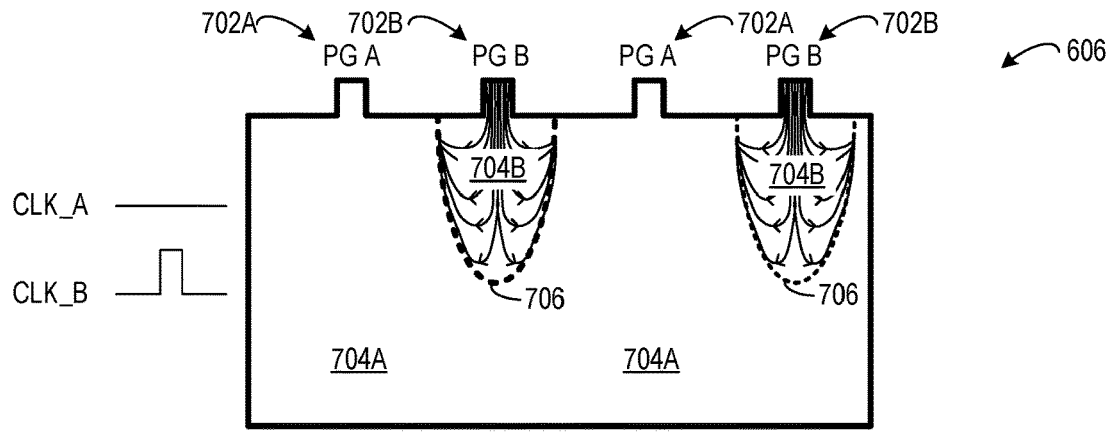

In some implementations, the sensors 606 of sensor array 604 may be differential sensors. FIGS. 7A, 7B, and 7C are cross-sectional views showing aspects of an example differential sensor 606 of sensor array 604 that optionally may be implemented in the camera 600 shown in FIG. 6. The differential sensor 606 may include first and second polysilicon gates (PG A, PG B) 702A, 702B. The polysilicon gates 702A may be energized according to clock signal Clk_A and polysilicon gates 702B may be energized according to clock signal Clk_B. The two clock signals may be controlled differently to control the sensor array to measure different types of illumination. For example, to measured active modulated illumination the two clock signals may be substantially complementary (e.g., Clk_A and Clk_B have 50% duty cycles that are 180 degrees out of phase). In other examples, the two clock signals may have a different relationship, such as for measuring ambient illumination or non-modulated active illumination.

When activated based on the clock signals, the polysilicon gates 702A, 702B create electric fields that respectively attract and collect photoelectric charges to different respective regions 704A, 704B of the differential sensor 606 corresponding to the different polysilicon gates based on the arrival time under the polysilicon gate oxide in the region 704A, 704B. In particular, collected photoelectric charges remain under the gate where the photoelectric charges are initially collected and ultimately diffuse slowly by self-repulsion under each polysilicon gate to a collection node. A p-type doped area 706 or shallow trench isolation (STI) between the different regions creates a potential barrier that ensures charges collected by one polysilicon gate do not transfer to an adjacent polysilicon gate even if one is at a higher potential.

In FIG. 7A, both of the clock signals Clk_A and Clk_B are biased to a low voltage such that the polysilicon gates 702A, 702B collect little or no photoelectric charge in the regions 704A, 704B. In FIG. 7B, clock signal Clk_A is biased to a high voltage and Clk_B is biased to a low voltage. When the Clk_A goes high, the polysilicon gates 702A become energized and photoelectric charge is collected in region 704A as indicated by the electric field lines. The electric field lines run tangent to the boundary of region 704A, so charge does not transfer from region 704A to region 704B. Also, since Clk_B is biased low, the polysilicon gates 702B are not energized, and thus minimal photoelectric charge is collected in region 704B. In FIG. 7C, clock signal Clk_B is biased to a high voltage and Clk_A is biased to a low voltage. When the Clk_B goes high, the polysilicon gates 702B become energized and photoelectric charge is collected in region 704B as indicated by the electric field lines. The electric field lines run tangent to the boundary of region 704B, so charge does not transfer from region 704B to region 704A. Also, since Clk_A is biased low, the polysilicon gates 702A are not energized, and thus minimal photoelectric charge is collected in region 704A.

The differential sensor 606 is configured to collect and assign photoelectric charge in synchronicity with modulation of clock signals Clk_A and Clk_B. The photoelectric charge assignment (classification to PG A or B) in the differential sensor 606 occurs simultaneously with charge collection under the polysilicon gates 702A, 702B, and therefore does not require the additional step of shifting charges from one gate to another gate. In one example, the differential spectral measurement can be performed by synchronously activating a designated spectral illuminator within the 50% time period when the polysilicon gates 702A are energized to collect photoelectric charge from the active illumination in the region 704A. Additionally, the ambient light measurement can be performed by energizing the polysilicon gates 702B while the designated spectral illuminator is deactivated to collect photoelectric charge from the ambient light in the region 704B. The photoelectric charge collected by the region 704B (i.e., the amount of ambient light) is subtracted from the photoelectric charge collected by the region 704A (i.e., the amount of active light and ambient light) to perform a differential measurement in which the ambient light bias is significantly reduced or removed from the measurement of the active illumination. Note this example applies to a scenario where modulated active illumination and ambient illumination are differentially measured.

Such operation allows for the same sensor array to be used to efficiently measure active light across a broad spectrum including ultraviolet, visible, NIR, and IR light. Further, the differential sensors may reduce system noise because only one read operation is required to perform a differential measurement of active spectral light and ambient light. In particular, each pixel readout/reset operation may add system noise per occurrence. Thus, rather than performing two separate measurements (i.e., active, passive) that require two readouts, and then adding (or subtracting) each result to memory, a single differential measurement may be performed within the pixel and the single differential measurement may be read out to memory. The depicted differential sensor is provided as an example and other differential sensor configurations may be used in other examples.

In other camera implementations that do not include sensor arrays of differential sensors, additional clock cycles may be required to perform a differential measurement. While differential sensors provide the advantages described herein, it will be appreciated that any suitable type of sensor array, including non-differential sensor arrays, may be implemented.

The term 'address' as applied to sensors 606 of sensor array 604 may have a somewhat different meaning depending on the imaging mode described. For broad-band or wide-band imaging—for spectral light including both visible and IR light—addressing the sensors 606 may include integrating the intensity of active light in the sub-band emitted from the designated spectral (or IR) illuminator and received at each sensor 606 and associating the integrated intensity of the active light in the sub-band with the portion of the image corresponding to that sensor.

For depth imaging, the sensors 606 may be addressed differently. Here, addressing the sensors may include resolving a phase offset from each sensor relative to the modulated intensity of the IR light. The phase offset, optionally converted into the depth domain, may be associated with the portion of the image corresponding to the sensor addressed. In other words, the depth controller machine 628 may be configured to determine a depth value for each sensor 606 of the sensor array 604. In some implementations, a series of IR image acquisitions (e.g., 6-9) in rapid succession may be used to obtain the phase offset. In combination depth- and flat-imaging applications, both of the above addressing modes may be used in a time multiplexed manner.

The phase-discriminating time-of-flight (ToF) approach described above is one of several depth-imaging technologies encompassed by this disclosure. In general, a depth-imaging camera may be configured to acquire one or more depth maps of a scene or subject. The term 'depth map' refers to an array of pixels registered to corresponding regions $(X_i, Y_i)$ of an imaged scene, with a depth value $(Z_i)$ indicating, for each pixel, the depth of the corresponding region. 'Depth' is defined as a coordinate parallel to the optical axis of the camera, which increases with increasing distance from the camera. The term 'depth video' refers herein to a time-resolved sequence of depth maps. In ToF implementations, the IR illumination source may project pulsed or otherwise modulated IR illumination towards the scene. The sensor array of the depth-imaging camera may be configured to detect the phase offset between the illumination reflected back from the scene and the modulated emission. In some implementations, the phase offset of each sensor may be converted into a pixel-resolved time of flight of the pulsed illumination, from the illumination source to the scene and then back to the array. ToF data may then be converted into depth data.

The term 'spectral light image' refers to a matrix of pixels registered to corresponding regions $(X_i, Y_i)$ of an imaged scene, with a spectral value $(SV_i)$ indicating, for each pixel, the spectral signature of the corresponding region in the particular spectral light sub-band. For acquiring the spectral light images in each of the sub-bands (e.g., for a multi-spectral light image), the spectral controller machine 130 is configured to determine a spectral value for each of the differential sensors based on the depth value and a differential measurement of active spectral light and ambient light for the differential sensor.

The depth and multi-spectral data acquired by the camera 600 may be used to fit a neighborhood of pixels to a regular surface (e.g., Lambertian plane, quadric surface), and solve the backscattering (albedo) coefficient for each of the sub-bands in order to calculate a spectral signature of the surface that is ambient light-invariant and can be robustly classified. In such calculations, the depth data may be used to account for a reduction in light intensity due to optical transmission of the light from the light source (IR illuminator 614 or spectral illuminators 618) to the scene 602. In some implementations, the spectral controller machine 630 may be configured to calculate a surface normal for each pixel of the plurality of pixels of the senor array based on the depth data. A set of surface normals for the plurality of pixels may represent a surface of an imaged scene or subject modeled by an analytic function (e.g., plane or quadric). In some implementations, the spectral controller machine 630 may be configured to calculate a curvature for each pixel of the plurality of pixels of the senor array based on the depth data. A set of curvatures for the plurality of pixels may represent a surface of an imaged scene or subject modeled by an analytic function (e.g., plane or quadric). The spectral controller machine 630 may be configured to normalize the spectral light measurements in the different spectral light sub-bands based on one or more of the measured depth and the surface normal. This provides a position-and ambient light-invariant spectral signature of an imaged scene or subject.

Output machine 632 is configured to output a matrix of pixels 640. Each pixel in the matrix includes the depth value $(Z_i)$ and the fluorescing light value (e.g., $SV1_i$, $SV2_i$, .... $SV6_i$) in each tested fluorescing light sub-bands for each of the plurality of illumination sub-bands. In some implementations, the output machine 632 may be further configured to, for each pixel, output a surface normal and/or a curvature. The output machine 632 may be configured to output the matrix of pixels 640 in any suitable form. In some examples, the output machine 632 may output the matrix of pixels 640 as a data structure in which each element of the matrix corresponds to a different pixel, and each element of the matrix includes an array of values corresponding to the fluorescing light values for that pixel and optionally the depth value and optionally a surface normal. Note that a spectral value for the IR light sub-band may be determined for each differential sensor in the process of determining the depth value, and thus each pixel in the matrix may include a spectral value for the IR light sub-band.

Further, note that the output machine 632 may be configured output the matrix of pixels 640 (and/or any other suitable parameter value) to any suitable recipient internal or external to the camera 600. In one example, the output machine 632 may be configured to output the matrix of pixels 640 to another processing component for additional image processing (e.g., filtering, computer vision). In some examples, the processing component may be incorporated into the camera 600. In some examples, the processing component may be incorporated into a remote computing device in communication with the camera 600. In another example, the output machine 632 may be configured to output the matrix of pixels 640 to an external display device for visual presentation as an image.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 8:
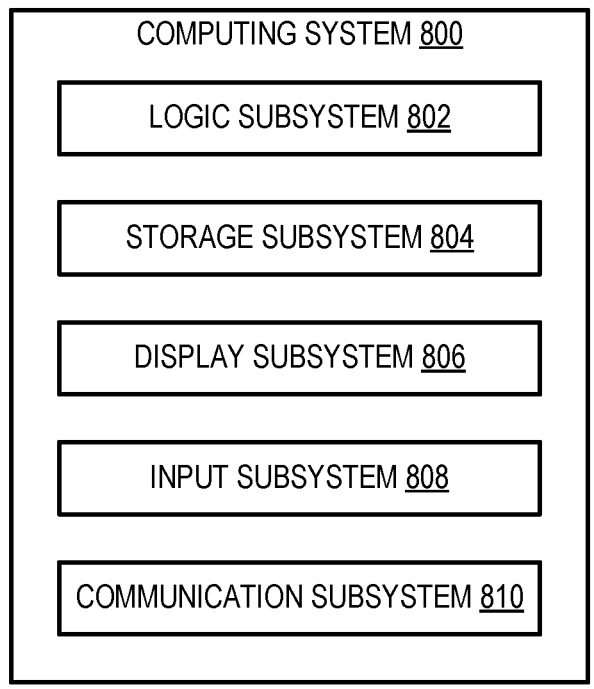
FIG. 8 shows an example computing system.

FIG. 8 schematically shows a simplified representation of a computing system 800 configured to provide any to all of the compute functionality described herein. Computing system 800 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. For example, computing system 800 may be representative of camera 102 and network computing system 124 in FIG. 1 and camera 600 in FIGS. 6A-6C.

Computing system 800 includes a logic subsystem 802 and a storage subsystem 804. Computing system 800 may optionally include a display subsystem 806, input subsystem 808, communication subsystem 810, and/or other subsystems not shown in FIG. 8.

Logic subsystem 802 includes one or more physical devices configured to execute instructions. For example, the logic subsystem 802 may be configured to execute instructions that are part of one or more applications, services, or other logical constructs. The logic subsystem 802 may include one or more hardware processors configured to execute software instructions. Additionally or alternatively, the logic subsystem 802 may include one or more hardware or firmware devices configured to execute hardware or firmware instructions. Processors of the logic subsystem 802 may be single-core or multi-core, and the instructions executed thereon may be configured for sequential, parallel, and/or distributed processing. Individual components of the logic subsystem 802 optionally may be distributed among two or more separate devices, which may be remotely located and/or configured for coordinated processing. Aspects of the logic subsystem 802 may be virtualized and executed by remotely-accessible, networked computing devices configured in a cloud-computing configuration.

Storage subsystem 804 includes one or more physical devices configured to temporarily and/or permanently hold computer information such as data and instructions executable by the logic subsystem 802. When the storage subsystem 804 includes two or more devices, the devices may be collocated and/or remotely located. Storage subsystem 804 may include volatile, nonvolatile, dynamic, static, read/write, read-only, random-access, sequential-access, location-addressable, file-addressable, and/or content-addressable devices. Storage subsystem 804 may include removable and/or built-in devices. When the logic subsystem 802 executes instructions, the state of storage subsystem 804 may be transformed—e.g., to hold different data.

Aspects of logic subsystem 802 and storage subsystem 804 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem 802 and the storage subsystem 804 may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 806 may be used to present a visual representation of data held by storage subsystem 804. This visual representation may take the form of a graphical user interface (GUI). Display subsystem 806 may include one or more display devices utilizing virtually any type of technology. In some implementations, display subsystem may include one or more virtual-, augmented-, or mixed reality displays.

When included, input subsystem 808 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board.

Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 810 may be configured to communicatively couple computing system 800 with one or more other computing devices. Communication subsystem 810 may include wired and/or wireless communication devices compatible with one or more different communication protocols. The communication subsystem 810 may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user owning the data should be notified, and the user data should only be collected when the user provides affirmative consent. If data is to be collected, it can and should be collected with the utmost respect for user privacy. If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

In an example, a camera system comprises one or more spectral illuminators configured to emit active spectral light toward a scene, wherein the active spectral light is tunable to a plurality of different illumination sub-bands, a sensor array including a plurality of sensors, a tunable optical filter optically intermediate the sensor array and the scene, and a controller configured to dynamically tune the active spectral light to a selected illumination sub-band from the plurality of different illumination sub-bands, sequentially one at a time for each of a plurality of different fluorescing light sub-bands different than the selected illumination sub-band, dynamically adjust the tunable optical filter to block light from being transmitted from the scene to the sensor array in all but a tested fluorescing light sub-band from the plurality of different fluorescing light sub-bands, and address the plurality of sensors of the sensor array to acquire one or more images of the scene in the tested fluorescing light sub-band. In this example and/or other examples, the controller may be further configured to identify a spectral fluorescent signature from the one or more images of the scene in each tested fluorescing light sub-band. In this example and/or other examples, the controller may be further configured to match the identified spectral fluorescent signature to a known substance. In this example and/or other examples, the controller may be further configured to send the one or more images of the scene in each tested fluorescing light sub-band to a remote computing system for additional computer analysis if the identified spectral fluorescent signature cannot be matched to a known substance, and receive from the remote computing system a known substance that matches the identified spectral fluorescent signature. In this example and/or other examples, the controller may be further configured to adjust a spectral image parameter of the camera system for future spectral fluorescent signature identification based on the identified spectral fluorescent signature. In this example and/or other examples, the controller may be further configured to sequentially one at a time for each of the plurality of different illumination sub-bands dynamically tune the active spectral light to a selected illumination sub-band from the plurality of different illumination sub-bands, sequentially one at a time for each of the plurality of different fluorescing light sub-bands while the active spectral light is tuned to the selected illumination sub-band, dynamically adjust the tunable optical filter to block light from being transmitted from the scene to the sensor array in all but a tested fluorescing light sub-band from the plurality of different fluorescing light sub-bands, address the plurality of sensors of the sensor array to acquire one or more images of the scene in the tested fluorescing light sub-band, and identify a spectral fluorescent signature from the one or more images of the scene in each tested fluorescing light sub-band for each of the plurality of different illumination sub-bands. In this example and/or other examples, the camera system may further comprise an IR illuminator configured to emit active IR light in an IR light sub-band, and the controller may be further configured to dynamically adjust the tunable optical filter to block light outside of the IR sub-band from being transmitted from the scene to the sensor array, activate the IR illuminator to illuminate the scene with the active IR light, address the plurality of sensors of the sensor array to acquire one or more depth images of the scene based on active IR light reflected from the scene, and identify a spectral fluorescent signature from the one or more images of the scene in each tested fluorescing light sub-band and the one or more depth images. In this example and/or other examples, the controller may be further configured to determine a surface normal of a surface in the scene based on the one or more depth images, and wherein the spectral fluorescent signature is identified for a surface in the scene based on the surface normal. In this example and/or other examples, the one or more spectral illuminators may include a plurality of spectral illuminators having different spectral light sub-bands, and dynamically tuning the active spectral light to the selected illumination sub-band may include activating each of the plurality of spectral illuminators configured to emit active spectral light in the selected illumination sub-band. In this example and/or other examples, the one or more spectral illuminators may include a broad-band spectral illuminator, and the camera system may further comprise an illumination filter optically intermediate the broad-band spectral illuminator and the scene, and wherein the controller is further configured to dynamically adjust the illumination filter to block active spectral light from being transmitted from the broad-band spectral illuminator to the scene in all but the selected illumination sub-band. In this example and/or other examples, the plurality of sensors of the sensor array may be differential sensors, and each of the one or more images of the scene in each tested fluorescing light sub-band may include a matrix of fluorescing values, each fluorescing value determined based on a differential measurement performed by a differential sensor of the sensor array.

In an example, a method for controlling a camera comprises dynamically tuning active spectral light emitted from one or more spectral illuminators of the camera towards a scene to an illumination sub-band selected from a plurality of different illumination sub-bands, sequentially one at a time for each of a plurality of different fluorescing light sub-bands different than the selected illumination sub-band, dynamically adjusting a tunable optical filter of the camera to block light from the scene from being transmitted to a sensor array of the camera in all but a tested fluorescing light sub-band from the plurality of different fluorescing light sub-bands, and addressing a plurality of sensors of the sensor array to acquire one or more images of the scene in the tested fluorescing light sub-band. In this example and/or other examples, the method may further comprise identifying a spectral fluorescent signature from the one or more images of the scene in each tested fluorescing light sub-band. In this example and/or other examples, the method may further comprises matching the identified spectral fluorescent signature to a known substance. In this example and/or other examples, the method may further comprise sending the one or more images of the scene in each tested fluorescing light sub-band to a remote computing system for additional computer analysis if the identified spectral fluorescent signature cannot be matched to a known substance, and receiving from the remote computing system a known substance that matches the identified spectral fluorescent signature. In this example and/or other examples, the method may further comprise adjusting a spectral image parameter of the camera for future spectral fluorescent signature identification based on the identified spectral fluorescent signature. In this example and/or other examples, the method may further comprise sequentially one at a time for each of the plurality of different illumination sub-bands, dynamically tuning the active spectral light to a selected illumination sub-band from the plurality of different illumination sub-bands, sequentially one at a time for each of the plurality of different fluorescing light sub-bands while the active spectral light is tuned to the selected illumination sub-band, dynamically adjusting the tunable optical filter to block light from being transmitted from the scene to the sensor array in all but a tested fluorescing light sub-band from the plurality of different fluorescing light sub-bands, addressing the plurality of sensors of the sensor array to acquire one or more images of the scene in the tested fluorescing light sub-band, and identifying a spectral fluorescent signature from the one or more images of the scene in each tested fluorescing light sub-band for each of the plurality of different illumination sub-bands. In this example and/or other examples, the method may further comprise activate an IR illuminator of the camera to illuminate the scene with the active IR light, address the plurality of sensors of the sensor array to acquire one or more depth images of the scene based on active IR light reflected from the scene, and identify a spectral fluorescent signature from the one or more images of the scene in each tested fluorescing light sub-band and the one or more depth images. In this example and/or other examples, the method may further comprise determining a surface normal of a surface in the scene based on the one or more depth images, and wherein the spectral fluorescent signature is identified for a surface in the scene based on the surface normal.

In an example, a method for controlling a camera comprises sequentially one at a time for each of a plurality of different illumination sub-bands, dynamically tuning active spectral light emitted from one or more spectral illuminators of the camera towards a scene to an illumination sub-band selected from the plurality of different illumination sub-bands, sequentially one at a time for each of a plurality of different fluorescing light sub-bands different than the selected illumination sub-band while the active spectral light is tuned to the selected illumination sub-band, dynamically adjusting a tunable optical filter of the camera to block light from the scene from being transmitted to a sensor array of the camera in all but a tested fluorescing light sub-band from the plurality of different fluorescing light sub-bands, and addressing a plurality of sensors of the sensor array to acquire one or more images of the scene in the tested fluorescing light sub-band.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A camera system, comprising:
one or more spectral illuminators configured to emit active spectral light toward a scene, wherein the active spectral light is tunable to a plurality of different illumination sub-bands;
a sensor array including a plurality of sensors;
a tunable optical filter optically intermediate the sensor array and the scene; and
a controller configured to:
dynamically tune the active spectral light to a selected illumination sub-band from the plurality of different illumination sub-bands;
sequentially one at a time for each of a plurality of different fluorescing light sub-bands different than the selected illumination sub-band:
dynamically adjust the tunable optical filter to block light from being transmitted from the scene to the sensor array in all but a tested fluorescing light sub-band from the plurality of different fluorescing light sub-bands, and
address the plurality of sensors of the sensor array to acquire one or more images of the scene in the tested fluorescing light sub-band.

2. The camera system of claim 1, wherein the controller is further configured to identify a spectral fluorescent signature from the one or more images of the scene in each tested fluorescing light sub-band.

3. The camera system of claim 2, wherein the controller is further configured to match the identified spectral fluorescent signature to a known substance.

4. The camera system of claim 3, wherein the controller is further configured to:
send the one or more images of the scene in each tested fluorescing light sub-band to a remote computing system for additional computer analysis if the identified spectral fluorescent signature cannot be matched to a known substance, and receive from the remote computing system a known substance that matches the identified spectral fluorescent signature.

5. The camera system of claim 2, wherein the controller is further configured to:
adjust a spectral image parameter of the camera system for future spectral fluorescent signature identification based on the identified spectral fluorescent signature.

6. The camera system of claim 1, wherein the controller is further configured to:
sequentially one at a time for each of the plurality of different illumination sub-bands:
dynamically tune the active spectral light to a selected illumination sub-band from the plurality of different illumination sub-bands,
sequentially one at a time for each of the plurality of different fluorescing light sub-bands while the active spectral light is tuned to the selected illumination sub-band:
dynamically adjust the tunable optical filter to block light from being transmitted from the scene to the sensor array in all but a tested fluorescing light sub-band from the plurality of different fluorescing light sub-bands,
address the plurality of sensors of the sensor array to acquire one or more images of the scene in the tested fluorescing light sub-band, and
identify a spectral fluorescent signature from the one or more images of the scene in each tested fluorescing light sub-band for each of the plurality of different illumination sub-bands.

7. The camera system of claim 1, further comprising:
an IR illuminator configured to emit active IR light in an IR light sub-band; and
wherein the controller is further configured to:
dynamically adjust the tunable optical filter to block light outside of the IR sub-band from being transmitted from the scene to the sensor array,
activate the IR illuminator to illuminate the scene with the active IR light,
address the plurality of sensors of the sensor array to acquire one or more depth images of the scene based on active IR light reflected from the scene, and
identify a spectral fluorescent signature from the one or more images of the scene in each tested fluorescing light sub-band and the one or more depth images.

8. The camera system of claim 7, wherein the controller is further configured to:
determine a surface normal of a surface in the scene based on the one or more depth images, and wherein the spectral fluorescent signature is identified for a surface in the scene based on the surface normal.

9. The camera system of claim 1, wherein the one or more spectral illuminators includes a plurality of spectral illuminators having different spectral light sub-bands, and wherein dynamically tuning the active spectral light to the selected illumination sub-band includes activating each of the plurality of spectral illuminators configured to emit active spectral light in the selected illumination sub-band.

10. The camera system of claim 1, wherein the one or more spectral illuminators includes a broad-band spectral illuminator, and wherein the camera system further comprises an illumination filter optically intermediate the broad-band spectral illuminator and the scene, and wherein the controller is further configured to:
dynamically adjust the illumination filter to block active spectral light from being transmitted from the broad-band spectral illuminator to the scene in all but the selected illumination sub-band.

11. The camera system of claim 1, wherein the plurality of sensors of the sensor array are differential sensors, and wherein each of the one or more images of the scene in each tested fluorescing light sub-band include a matrix of fluorescing values, each fluorescing value determined based on a differential measurement performed by a differential sensor of the sensor array.

12. A method for controlling a camera, the method comprising:
dynamically tuning active spectral light emitted from one or more spectral illuminators of the camera towards a scene to an illumination sub-band selected from a plurality of different illumination sub-bands;
sequentially one at a time for each of a plurality of different fluorescing light sub-bands different than the selected illumination sub-band:
dynamically adjusting a tunable optical filter of the camera to block light from the scene from being transmitted to a sensor array of the camera in all but a tested fluorescing light sub-band from the plurality of different fluorescing light sub-bands; and
addressing a plurality of sensors of the sensor array to acquire one or more images of the scene in the tested fluorescing light sub-band.

13. The method of claim 12, further comprising:
identifying a spectral fluorescent signature from the one or more images of the scene in each tested fluorescing light sub-band.

14. The method of claim 13, further comprising:
matching the identified spectral fluorescent signature to a known substance.

15. The method of claim 14, further comprising:
sending the one or more images of the scene in each tested fluorescing light sub-band to a remote computing system for additional computer analysis if the identified spectral fluorescent signature cannot be matched to a known substance; and
receiving from the remote computing system a known substance that matches the identified spectral fluorescent signature.

16. The method of claim 13, further comprising:
adjusting a spectral image parameter of the camera for future spectral fluorescent signature identification based on the identified spectral fluorescent signature.

17. The method of claim 12, further comprising:
sequentially one at a time for each of the plurality of different illumination sub-bands:
dynamically tuning the active spectral light to a selected illumination sub-band from the plurality of different illumination sub-bands;
sequentially one at a time for each of the plurality of different fluorescing light sub-bands while the active spectral light is tuned to the selected illumination sub-band:
dynamically adjusting the tunable optical filter to block light from being transmitted from the scene to the sensor array in all but a tested fluorescing light sub-band from the plurality of different fluorescing light sub-bands;

addressing the plurality of sensors of the sensor array to acquire one or more images of the scene in the tested fluorescing light sub-band; and identifying a spectral fluorescent signature from the one or more images of the scene in each tested fluorescing light sub-band for each of the plurality of different illumination sub-bands.

18. The method of claim 17, further comprising:

activate an IR illuminator of the camera to illuminate the scene with the active IR light, address the plurality of sensors of the sensor array to acquire one or more depth images of the scene based on active IR light reflected from the scene, and identify a spectral fluorescent signature from the one or more images of the scene in each tested fluorescing light sub-band and the one or more depth images.

19. The method of claim 18, further comprising:

determining a surface normal of a surface in the scene based on the one or more depth images, and wherein the spectral fluorescent signature is identified for a surface in the scene based on the surface normal.

20. A method for controlling a camera, the method comprising:

sequentially one at a time for each of a plurality of different illumination sub-bands:

dynamically tuning active spectral light emitted from one or more spectral illuminators of the camera towards a scene to an illumination sub-band selected from the plurality of different illumination sub-bands;

sequentially one at a time for each of a plurality of different fluorescing light sub-bands different than the selected illumination sub-band while the active spectral light is tuned to the selected illumination sub-band:

dynamically adjusting a tunable optical filter of the camera to block light from the scene from being transmitted to a sensor array of the camera in all but a tested fluorescing light sub-band from the plurality of different fluorescing light sub-bands; and addressing a plurality of sensors of the sensor array to acquire one or more images of the scene in the tested fluorescing light sub-band.

* * * * *